(12) United States Patent
Mihara et al.

(10) Patent No.: US 10,627,897 B2
(45) Date of Patent: Apr. 21, 2020

(54) HEAD MOUNTED DISPLAY, DISPLAY CONTROL DEVICE, PROCESSING METHOD, DISPLAY METHOD, AND STORAGE MEDIUM

(71) Applicant: FUJITSU LIMITED, Kawasaki-shi, Kanagawa (JP)

(72) Inventors: Motonobu Mihara, Kawasaki (JP); Akinori Taguchi, Kawasaki (JP); Koichiro Niinuma, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/185,592

(22) Filed: Nov. 9, 2018

(65) Prior Publication Data
US 2019/0171282 A1    Jun. 6, 2019

(30) Foreign Application Priority Data
Dec. 4, 2017    (JP) .................. 2017-232771

(51) Int. Cl.
*G06F 3/01* (2006.01)
*G01C 21/12* (2006.01)
*G06K 9/00* (2006.01)
*G06F 1/16* (2006.01)

(52) U.S. Cl.
CPC ............ *G06F 3/012* (2013.01); *G01C 21/12* (2013.01); *G06F 1/163* (2013.01); *G06F 3/011* (2013.01); *G06F 3/017* (2013.01); *G06K 9/00335* (2013.01)

(58) Field of Classification Search
None
See application file for complete search history.

(56) References Cited

U.S. PATENT DOCUMENTS

| | | | | |
|---|---|---|---|---|
| 5,977,935 A | * | 11/1999 | Yasukawa | G02B 27/017 340/980 |
| 9,135,915 B1 | * | 9/2015 | Johnson | G10L 15/26 |
| 2013/0229711 A1 | | 9/2013 | Kato et al. | |
| 2013/0235169 A1 | | 9/2013 | Kato et al. | |
| 2014/0002620 A1 | | 1/2014 | Murakami et al. | |

FOREIGN PATENT DOCUMENTS

| | | |
|---|---|---|
| JP | 2004-286832 | 10/2004 |
| JP | 2012-165272 | 8/2012 |
| JP | 2012-191483 | 10/2012 |
| WO | 2012-157195 | 11/2012 |
| WO | 2012-172719 | 12/2012 |

* cited by examiner

*Primary Examiner* — Christopher J Kohlman
(74) *Attorney, Agent, or Firm* — Fujitsu Patent Center

(57) ABSTRACT

A non-transitory computer-readable storage medium storing a program that causes a processor of a head mounted display to execute a process, the process includes obtaining a result of measurement performed by an acceleration sensor included in the head mounted display; and determining whether a user with the head mounted display is chewing a food or the user is speaking based on the result of the measurement performed by the acceleration sensor.

9 Claims, 10 Drawing Sheets

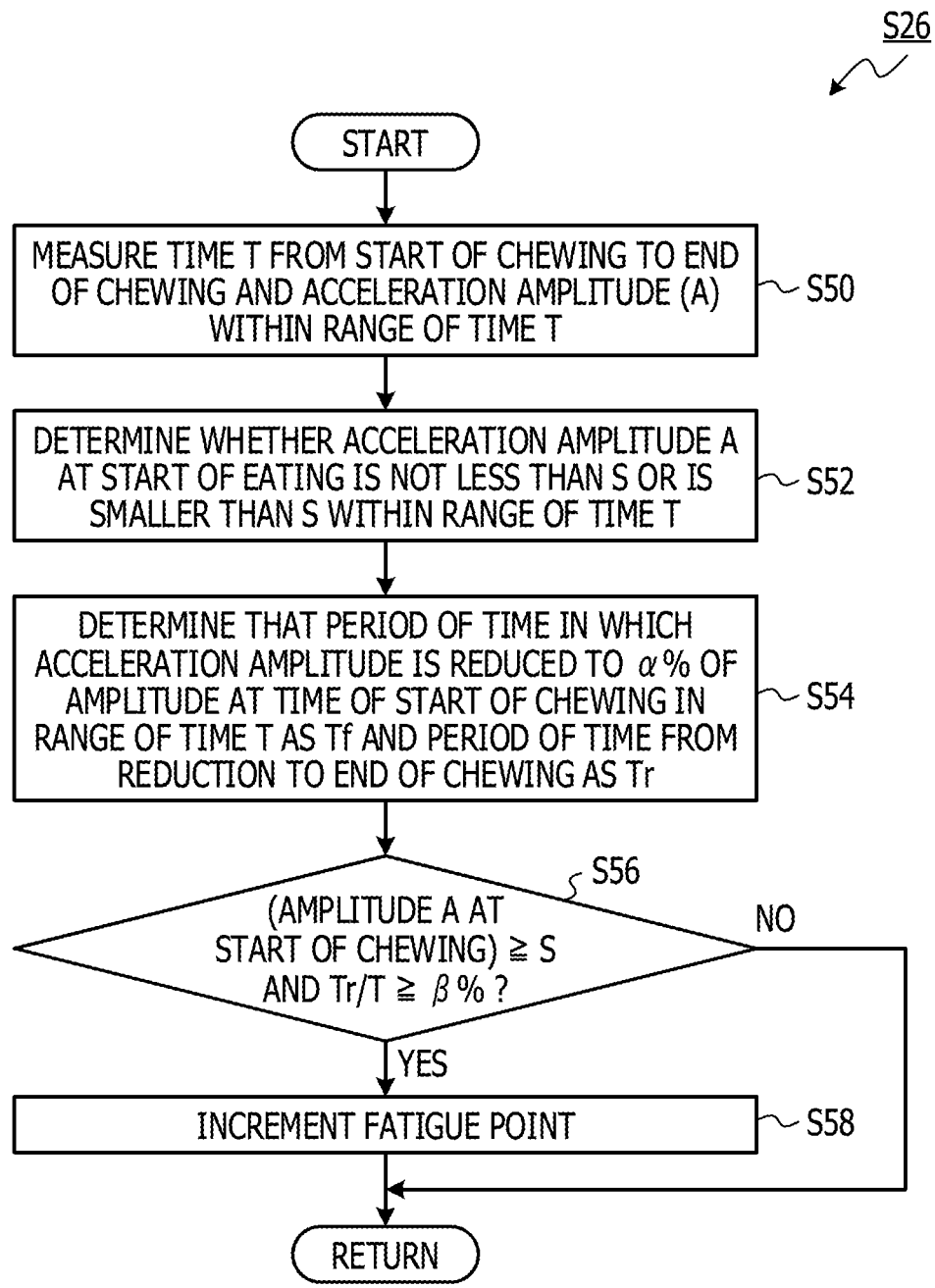

| FOOD | CHEWABILITY | CUTLERY | USABILITY | FATIGUE DETERMINATION TIME |
|---|---|---|---|---|
| MEAT | HARD | KNIFE AND FORK | DIFFICULT | Td |
| VEGETABLE | MIDDLE | FORK | MIDDLE | Tm |
| NOODLE | SOFT | CHOPSTICKS | EASY | Te |
| MEAT | HARD | CHOPSTICKS | EASY | Th |
| VEGETABLE | MIDDLE | CHOPSTICKS | EASY | Tl |
| NOODLE | SOFT | FORK | EASY | Te |
| ... | ... | ... | ... | ... |

HEAD MOUNTED DISPLAY, DISPLAY CONTROL DEVICE, PROCESSING METHOD, DISPLAY METHOD, AND STORAGE MEDIUM

CROSS-REFERENCE TO RELATED APPLICATION

This application is based upon and claims the benefit of priority of the prior Japanese Patent Application No. 2017-232771, filed on Dec. 4, 2017, the entire contents of which are incorporated herein by reference.

FIELD

The embodiments discussed herein are related to a head mounted display, a display control device, a processing method, a display method, and a storage medium.

BACKGROUND

In recent years, a head mounted display (HMD) has been developed and commercialized. Recently, a technique of supporting a user on a restricted diet by displaying calories and ingredients of foods in front of the user with the HMD or a technique of having a meal while the user virtually faces another remote user by displaying the remote user in the HMD have been studied.

In the HMD, a technique of detecting eyestrain of a user and notifying the user of the eyestrain has been used (refer to Japanese Laid-open Patent Publication No. 2004-286832, for example).

However, in Japanese Laid-open Patent Publication No. 2004-286832, usability of the HMD during a meal has not been discussed. Accordingly, the present disclosure preferably contributes to improvement of usability of the head mounted display during a meal.

SUMMARY

According to an aspect of the embodiments, a non-transitory computer-readable storage medium storing a program that causes a processor of a head mounted display to execute a process, the process includes obtaining a result of measurement performed by an acceleration sensor included in the head mounted display; and determining whether a user with the head mounted display is chewing a food or the user is speaking based on the result of the measurement performed by the acceleration sensor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a flowchart of a detailed process performed in step S26 of FIG. 4;

FIG. 10 is a diagram illustrating a fatigue determination table.

DESCRIPTION OF EMBODIMENTS

First Embodiment

Figure 1:
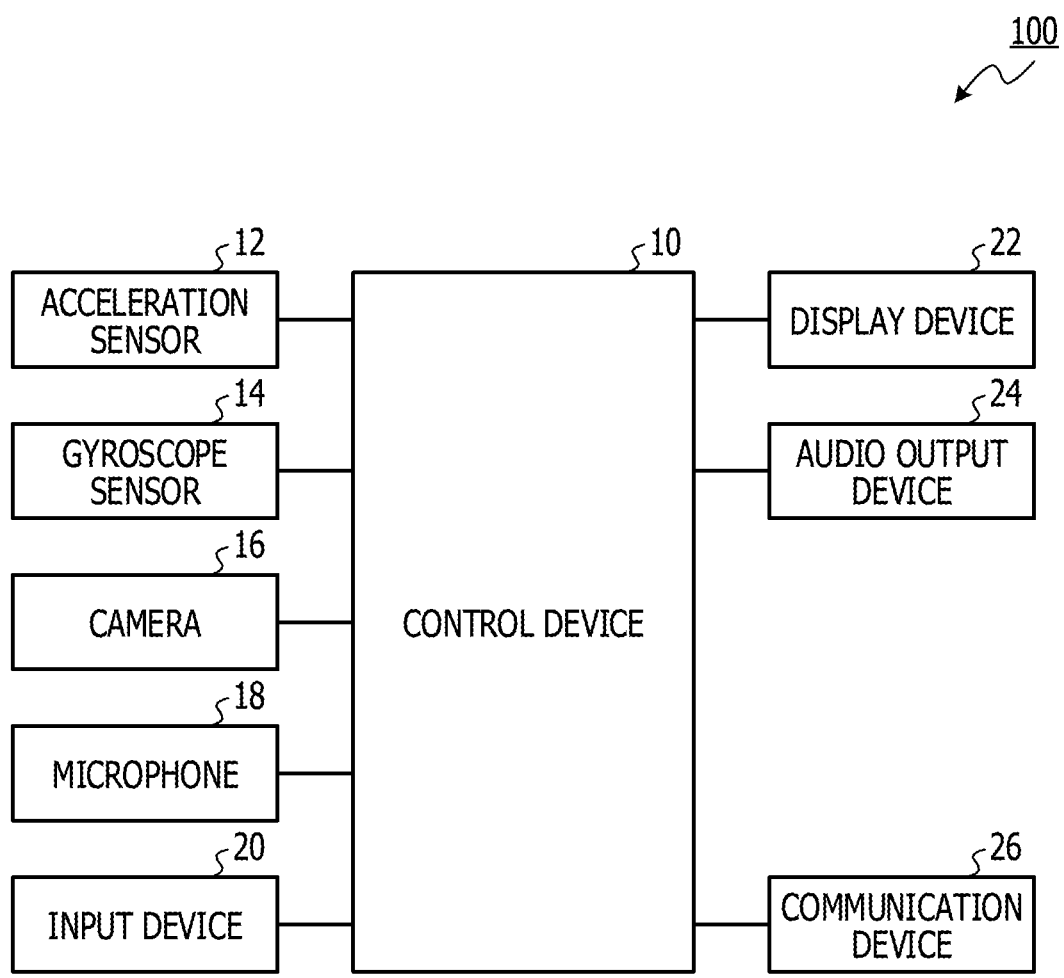
FIG. 1 is a diagram schematically illustrating a configuration of a head mounted display according to a first embodiment.

Hereinafter, a head mounted display according to a first embodiment will be described in detail with reference to FIGS. 1 to 7B. In FIG. 1, a hardware configuration of a head mounted display (HMD) 100 according to a first embodiment is schematically illustrated.

The HMD 100 is an apparatus which may be worn by a user on a head. Examples of the HMD 100 include a monocular transparent type HMD. The examples of the HMD 100 further include various HMDs, such as a binocular HMD and an immersive HMD.

As illustrated in FIG. 1, the HMD 100 includes an acceleration sensor 12, a gyroscope sensor 14, a camera 16 serving as an imaging unit, a microphone 18, an input device 20, a display device 22 serving as a display unit, an audio output device 24, a communication device 26, and a control device 10 serving as an information processing device.

The acceleration sensor 12 detects acceleration of the HMD 100. Examples of the acceleration sensor 12 include a piezoresistance triaxial accelerometer and an electrostatic capacitance triaxial accelerometer. A result of measurement performed by the acceleration sensor 12 is transmitted to the control device 10.

The gyroscope sensor 14 detects an angle (an orientation), an angular velocity, or angular acceleration of the HMD 100. Examples of the gyroscope sensor 14 include a vibration gyroscope sensor. A result of measurement performed by the gyroscope sensor 14 is transmitted to the control device 10. The gyroscope sensor 14 may detect an inclination of a head of the user who wears the HMD 100, for example.

The HMD 100 may include, in addition to the acceleration sensor 12 and the gyroscope sensor 14, a direction sensor, a geomagnetic sensor, and a global positioning system (GPS).

The camera 16 is disposed in the vicinity of eyes of the user and performs imaging in a gaze direction of the user with the HMD 100. An image captured by the camera 16 is transmitted to the control device 10.

The microphone 18 collects user voice and surrounding sound. The input device 20 includes a touchpad and buttons, such as a power button, a home button, and a volume control button.

The display device 22 displays various information. The display device 22 projects information on a half mirror. Specifically, the display device 22 is a transparent type display device which allows the user to view an outside scene in a transparent manner along with the information.

The display device 22 may be an immersive display type, a video transparent type, or a retinal projection type.

The audio output device 24, which is a speaker or earphones, outputs audio information under control of the control device 10.

The communication device 26 receives a wireless signal or communication data supplied from a base station (a mobile network) through an antenna or the like and transmits a wireless signal or communication data to the base station. The communication device 26 performs short range communication with a computer, such as another terminal, using a short range communication method, such as infrared communication, WiFi, or Bluetooth (registered trademark).

Figure 2:
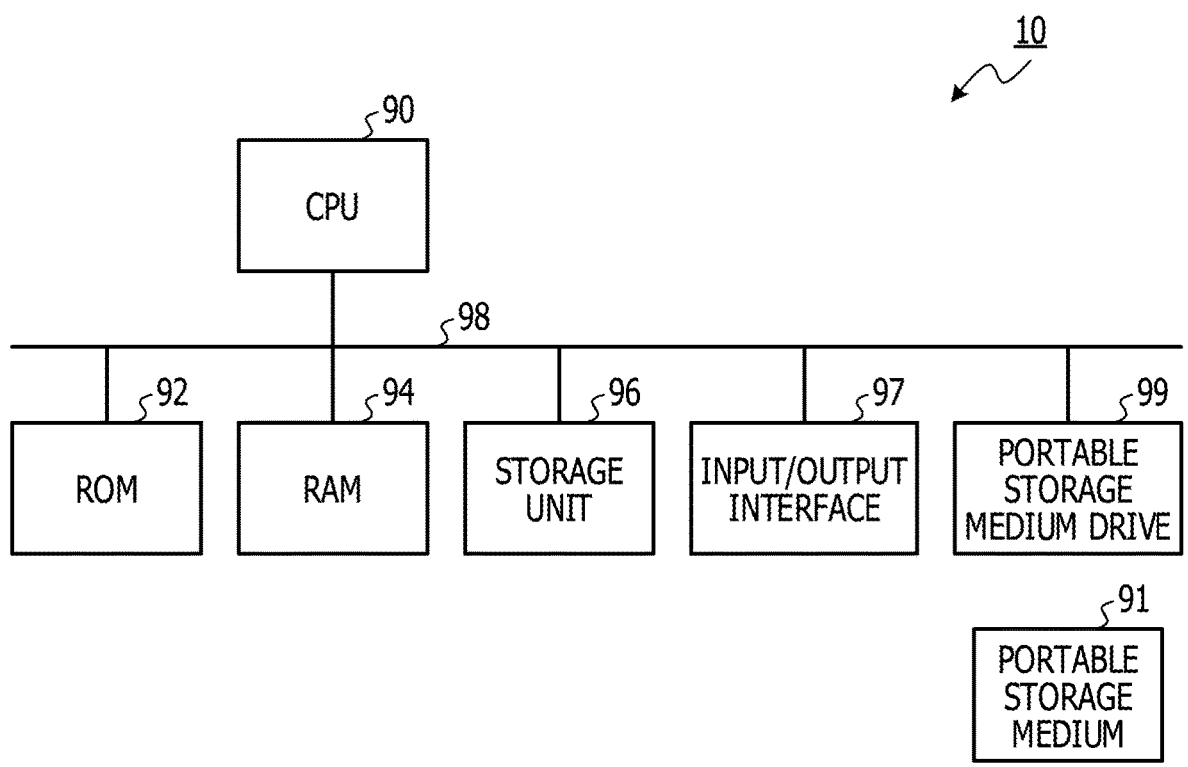
FIG. 2 is a diagram illustrating a hardware configuration of a control device of FIG. 1.
Figure 3:
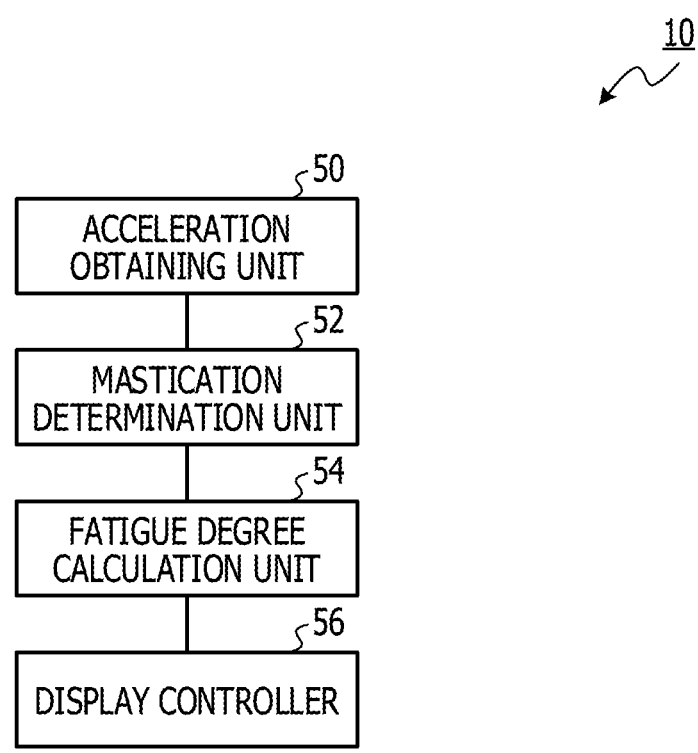
FIG. 3 is a functional block diagram of the control device.

The control device 10 integrally controls the units included in the HMD 100. In particular, the control device 10 has a function of appropriately controlling display of the display device 22 while the user with the HMD 100 is having a meal in this embodiment. FIG. 2 is a diagram illustrating a hardware configuration of the control device 10. As illustrated in FIG. 2, the control device 10 includes a central processing unit (CPU) 90, a read only memory (ROM) 92, a random access memory (RAM) 94, a storage unit (a solid state drive (SSD) or a flash memory in this embodiment) 96, an input/output interface 97, and a portable storage medium drive 99. The components included in the control device 10 are connected to a bus 98. The input/output interface 97 is connected to the various devices other than the control device 10 of FIG. 1. In the control device 10, programs (including a processing program and a display program) stored in the ROM 92 or the storage unit 96 or programs (including a processing program and a display program) read by the portable storage medium drive 99 from a portable storage medium 91 are executed by the CPU 90 so that functions of the units illustrated in FIG. 3 are realized. Each of the functions of the units of FIG. 3 may be realized by an integrated circuit, such as an application specific integrated circuit (ASIC) or a field programmable gate array (FPGA).

FIG. 3 is a functional block diagram of the control device 10. As illustrated in FIG. 3, the control device 10 functions as an acceleration obtaining unit 50 serving as an obtaining unit, a mastication determination unit 52 serving as a determination unit, a fatigue degree calculation unit 54 serving as a calculation unit, and a display controller 56 when the CPU 90 executes the programs.

The acceleration obtaining unit 50 obtains a result of measurement performed by the acceleration sensor 12 and transmits the result to the mastication determination unit 52.

The mastication determination unit 52 determines whether a mouth of the user is moving in accordance with the measurement result of the acceleration sensor 12. When the determination is affirmative, the mastication determination unit 52 determines whether the user is chewing (masticating) a food (an ingredient) or the user is speaking.

When it is determined that the user is chewing a food, the fatigue degree calculation unit 54 determines whether the user gets tired due to the chewing. When the determination is affirmative, a fatigue point is incremented. In this embodiment, it is assumed that the fatigue degree calculation unit 54 increments a fatigue point when the user chews a hard food and does not increment a fatigue point when the user chews a soft food since the user does not get tired.

The display controller 56 controls display in the display device 22 based on accumulated fatigue points.

Processing of Control Device 10

Figure 4:
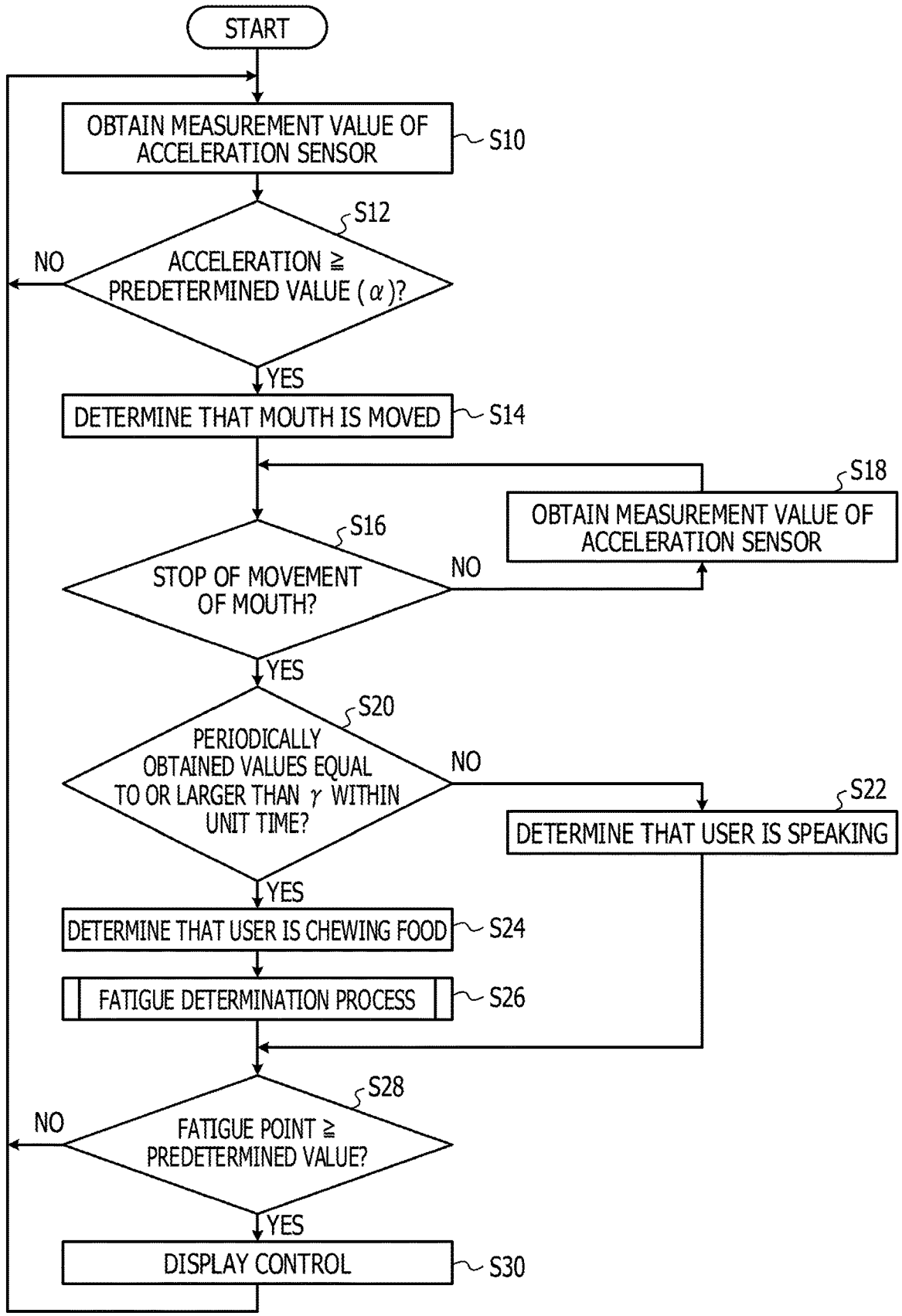
FIG. 4 is a flowchart of a process performed by the control device.

Next, processing performed by the control device 10 will be described in detail with reference to FIGS. 4 and 5 and other drawings where appropriate. Processes in FIGS. 4 and 5 are performed, provided that the user with the HMD 100 has a meal. The HMD 100 images a meal in front of the user so as to specify contents of the meal (ingredients) from the obtained image and displays calories and constituents of the ingredients in the display device 22. Therefore, the user may have a meal while checking the calories and the constituents. The HMD 100 is also capable of displaying a person who is having a meal in a remote location in the display device 22. By this, the user may virtually have a meal with the person in the remote location. Meanwhile, the user may get tired when masticating (chewing) ingredients during the meal. However, the user may not be aware of fatigue if the user wears the HMD 100, and therefore, the accumulated fatigue may harm a user's body. Accordingly, this process notifies the user of fatigue of the user during a meal and performs display in accordance with the fatigue so that usability of the HMD 100 by the user is improved.

The process in FIG. 4 is started when the user inputs information indicating that the user starts having a meal using the input device 20 or when the control device 10 determines that the user has started having a meal based on an image captured by the camera 16. At a time point when the process in FIG. 4 is started, a fatigue point, described below, has been reset (a fatigue point=0).

When the process in FIG. 4 is started, first, the acceleration obtaining unit 50 obtains a value of measurement performed by the acceleration sensor 12 in step S10. The acceleration obtaining unit 50 transmits the obtained measurement value to the mastication determination unit 52. In step S12, the mastication determination unit 52 determines whether acceleration is equal to or larger than a predetermined value ($\alpha$). Here, "$\alpha$" is a median of a range of acceleration which is possibly detected when the user moves a mouth. Specifically, when the acceleration is equal to or larger than the predetermined value $\alpha$, it is highly likely that the user is moving the mouth. The acceleration is approximately 0 if the user does not move the mouth at all. Therefore, amplitude of the acceleration indicates a maximum value of the acceleration in one motion of opening and closing of the mouth.

The process in step S10 is repeatedly performed while the determination in step S12 is negative. However, when the determination is affirmative in step S12, the process proceeds to step S14.

In step S14, the mastication determination unit 52 determines that the mouth is moving. In step S16, the mastication determination unit 52 determines whether the motion of the mouth has been stopped. Specifically, the mastication determination unit 52 determines whether amplitude of the acceleration is stable in the vicinity of 0. When the determination is negative in step S16, the process proceeds to step S18 where the mastication determination unit 52 obtains a measurement value of the acceleration sensor 12 through the acceleration obtaining unit 50 again. Thereafter, the process returns to step S16.

Figure 6A:
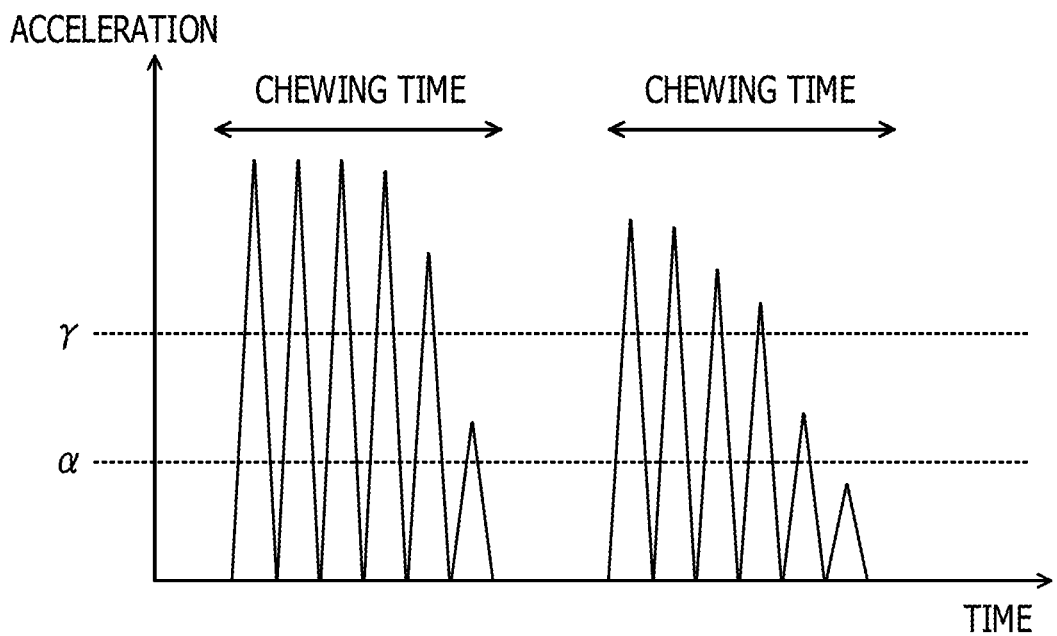
FIG. 6A is a graph illustrating a waveform of acceleration obtained when a user is chewing a food.
Figure 6B:
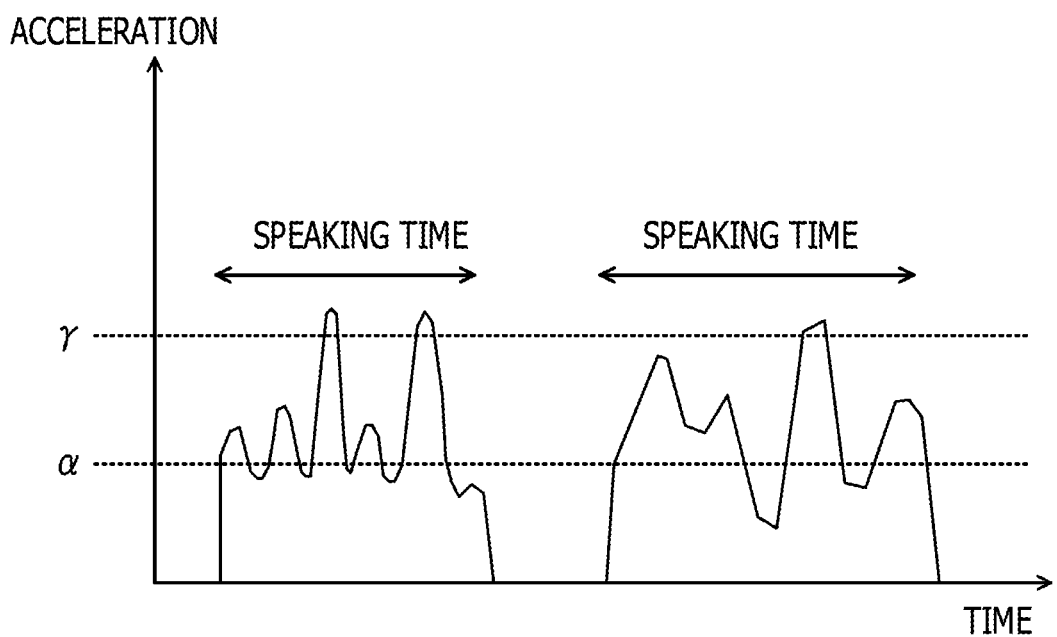
FIG. 6B is a graph illustrating a waveform of acceleration obtained when the user is speaking.

On the other hand, when the determination is affirmative in step S16, the process proceeds to step S20. Here, in FIG. 6A, a waveform of the acceleration obtained when the user is chewing (masticating) a food is illustrated. In FIG. 6B, a waveform of acceleration obtained when the user is speaking (making a speech) is illustrated. As is apparent from comparison between FIGS. 6A and 6B, amplitude waveforms in which the acceleration is continuously changed in accordance with a load obtained when upper and lower back teeth repeatedly abut on each other are obtained while the user is performing chewing. Specifically, when the user is performing chewing, heavy loads are applied to the back teeth which are indicated by pulses of large amplitude as illustrated in FIG. 6A. On the other hand, an applied load is negligible when the user is speaking, and therefore, small amplitude and a long cycle are attained as illustrated in FIG. 6B.

In step S20, the mastication determination unit 52 determines whether a value equal to or larger than γ is periodically obtained in a unit of time. Here, a value of the acceleration obtained while the user is speaking does not exceed "γ". However, a value of the acceleration obtained while the user is performing chewing frequently exceeds "γ".

When the determination is negative in step S20, the process proceeds to step S22 where the mastication determination unit 52 determines that the user is speaking. Specifically, when the waveform of the acceleration illustrated in FIG. 6B is obtained, the mastication determination unit 52 determines that the user is speaking. Thereafter, the process proceeds to step S28.

On the other hand, when the determination is affirmative in step S20, the process proceeds to step S24 where the mastication determination unit 52 determines that the user is chewing a food. Specifically, when the waveform of the acceleration illustrated in FIG. 6A is obtained, the mastication determination unit 52 determines that the user is performing chewing. Thereafter, the process proceeds to step S26 where the fatigue degree calculation unit 54 executes a fatigue determination process, and thereafter, the process proceeds to step S28.

Here, the fatigue determination process in step S26 will be described in detail with reference to the flowchart of FIG. 5. In the process in step S26, it is determined whether the user is chewing a hard food or a soft food. When it is determined that the user is chewing a hard hood, it is estimated that the user gets tired and a fatigue point of the user is incremented.

Figure 7A:
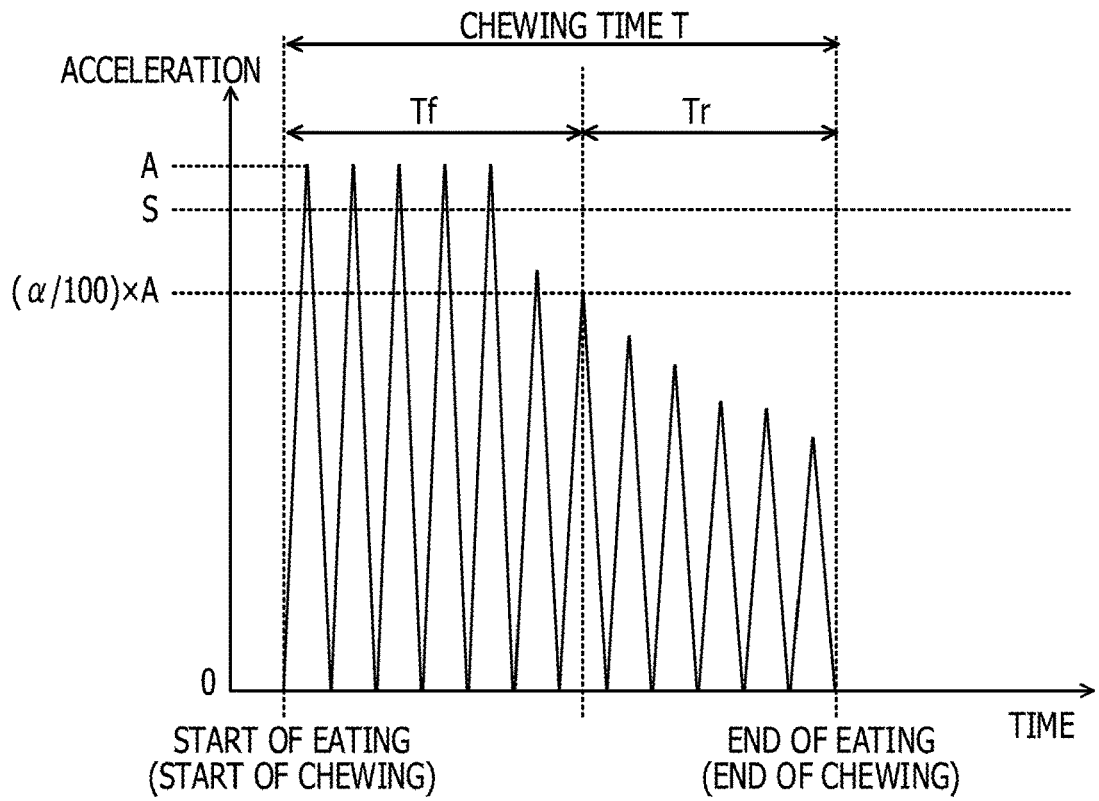
FIG. 7A is a graph illustrating a waveform of acceleration obtained when the user is chewing a hard food.
Figure 7B:
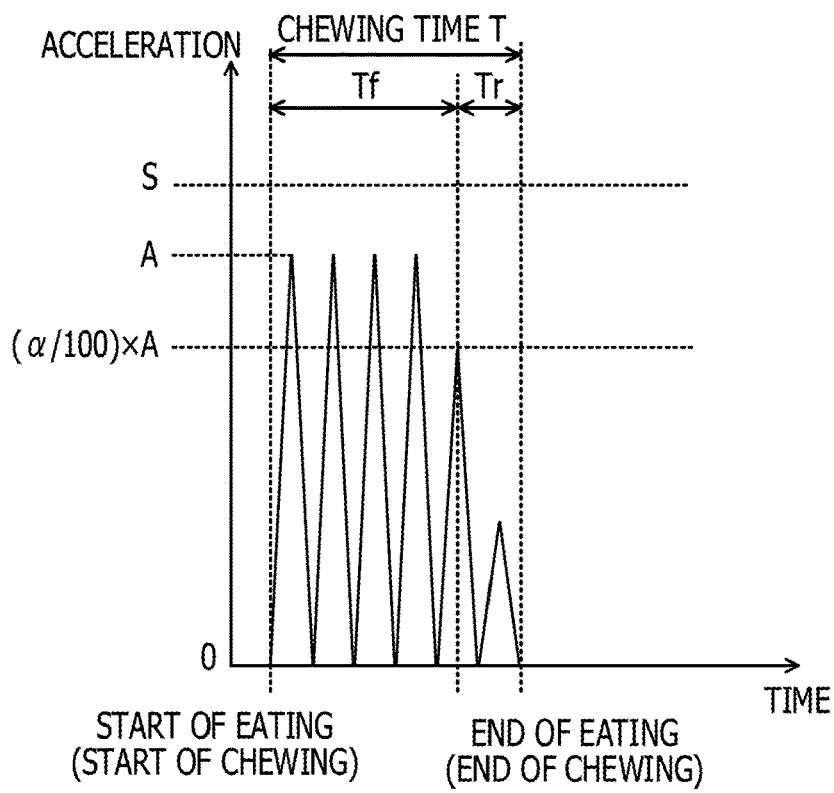
FIG. 7B is a graph illustrating a waveform of acceleration obtained when the user is chewing a soft food.

In the process of FIG. 5, first, in step S50, the fatigue degree calculation unit 54 measures a period of time (a chewing time) T from a start of chewing (a start of a meal) to an end of chewing (an end of the meal) and an amplitude A of acceleration in a range of the chewing time T. In this case, the fatigue degree calculation unit 54 obtains an acceleration waveform from the start of chewing to the end of chewing as illustrated in FIGS. 7A and 7B, and a chewing time T is obtained in accordance with the waveform. Then the fatigue degree calculation unit 54 measures amplitudes A of the acceleration waveform in a range of the chewing time T.

In step S52, the fatigue degree calculation unit 54 determines whether the amplitude A of the acceleration in the start of chewing in the range of the chewing time T is equal to or larger than a predetermined value S or smaller than the predetermined value S. The amplitude A is equal to or larger than the predetermined value S in the case of FIG. 7A, whereas the amplitude A is smaller than the predetermined value S in the case of FIG. 7B. The predetermined value S is a smallest value in acceleration amplitude obtained when the user starts chewing a hard food.

In step S54, the fatigue degree calculation unit 54 determines a period of time in which the acceleration amplitude at the start of chewing in the range of the chewing time T is reduced to α % of the amplitude A at the time of the start of chewing (a period of time until the acceleration amplitude becomes smaller than (α/100)×A) as Tf and a period of time from when the amplitude is reduced to α % of the amplitude A to the end of chewing as Tr (refer to FIGS. 7A and 7B).

In step S56, the fatigue degree calculation unit 54 determines whether the amplitude A at the start of chewing is equal to or larger than the predetermined value S and a value of Tr/T is equal to or larger than β % (β is 30, for example). As the user chews a harder food, the user intends to continue chewing for a longer time even after the food becomes soft, and therefore, a larger value of Tr/T means a harder food.

Accordingly, when the determination is negative in step S56 (in the case of the waveform in FIG. 7B), it is estimated that the user is not tired since the user is chewing a soft food (such as rice or tofu), and therefore, a fatigue point is not incremented, the process in FIG. 5 is terminated, and the process proceeds to step S28 of FIG. 4.

On the other hand, since the case where the determination is affirmative in step S56 (in the case of the waveform of FIG. 7A) means that the user is chewing a hard food (such as meat or a rice cake), it is determined that the user is tired since the user eats a chewy food and the fatigue degree calculation unit 54 increments a fatigue point in step S58. Specifically, the fatigue degree calculation unit 54 increments the fatigue point accumulated from the start of the meal by one. After the process in step S58, the process proceeds to step S28 of FIG. 4.

Referring back to FIG. 4, when the process proceeds to step S28, the display controller 56 determines whether the fatigue point exceeds a predetermined value. In step S28, the display controller 56 determines whether the user gets tired in the meal in a degree equal to or larger than a predetermined value. When the determination is negative in step S28, the process returns to step S10, and otherwise, the process proceeds to step S30.

When the process proceeds to step S30, the display controller 56 executes display control based on the fatigue point. For example, the display controller 56 displays information on fatigue in the display device 22 based on the fatigue point. For example, the display controller 56 displays information on a notification indicating that the user is tired and information indicating an action to be performed to alleviate the fatigue. In this case, the display controller 56 may display information including at least one of text and an image as the information on the fatigue. Alternatively, the display controller 56 may change a display form of characters or images (such as illustrations) based on the fatigue point. For example, when the fatigue point is smaller than a predetermined value, a small character size is used or characters are displayed in color which is less significant (quiet color) whereas when the fatigue point is larger than the predetermined value, a large character size is used or characters are displayed in significant color (eye-catching color). Alternatively, the display form may be changed in accordance with the fatigue point by another method. Here, the display controller 56 may display the information on the fatigue when a chewing action is not performed (when acceleration is not detected). For example, the display controller 56 may display the information on the fatigue at a timing immediately after the chewing action ends.

The information on the fatigue may be output by audio through the audio output device 24 instead of the display in the display device 22. In this case, the display in the display device 22 and the output through the audio output device 24 may be simultaneously performed.

The display controller 56 may differentiate the display form of the information to be displayed in the display device 22 (information on calories and information on ingredients, for example) based on the fatigue point, in addition to the display of the information on the fatigue. For example, when the fatigue point is large, large characters may be used to indicate the information displayed in the display device 22 or an eye-catching color may be used to indicate the information displayed in the display device 22 so that the information is easily recognized. By this, even if the user is tired, the user may not miss the information displayed in the display device 22. Furthermore, the tired user may not be further tired when viewing the information displayed in the display device 22.

When the process in step S30 is terminated as described above, the process returns to step S10 and the process described above is repeatedly performed. When the user inputs the end of the meal using the input device 20 or when the control device 10 determines the end of the meal based on an image captured by the camera 16, all the processes in FIGS. 4 and 5 are terminated.

As is apparent from the description above, according to the first embodiment, the acceleration obtaining unit 50, the mastication determination unit 52, and the fatigue degree calculation unit 54 realize a function of a detection unit which detects a degree of fatigue of the user with the HMD 100.

As described above in detail, according to the first embodiment, the control device 10 includes the acceleration obtaining unit 50 which obtains a measurement value of the acceleration sensor 12 included in the HMD 100 and the mastication determination unit 52 which determines whether the user is chewing or the user is speaking based on a measurement value obtained by the acceleration sensor 12. By this, the control device 10 may easily determine whether the user is chewing a food or the user is speaking with high accuracy based on the acceleration obtained when the user moves the mouth without using an image of the mouth, for example.

According to the first embodiment, the mastication determination unit 52 performs the determination based on the amplitude of the measurement value obtained by the acceleration sensor 12. By this, the determination may be appropriately made taking the different acceleration waveforms at the time of chewing and at the time of speaking (refer to FIGS. 6A and 6B) into consideration.

According to the first embodiment, the fatigue degree calculation unit 54 calculates the fatigue degree (the fatigue point) of the user based on the result of the determination performed by the mastication determination unit 52. By this, the degree of the fatigue of the user may be easily calculated.

In the first embodiment, when the mastication determination unit 52 determines that the user is chewing a food (S24), the fatigue degree calculation unit 54 calculates a fatigue degree of the user based on amplitude of the acceleration waveform (S26). By this, the determination as to whether the user gets tired due to the chewing may be accurately made. In this case, the fatigue degree of the user is calculated by determining whether the user is chewing a hard food or a soft food in accordance with the amplitude of the acceleration waveform, and therefore, the fatigue degree of the user may be accurately determined based on characteristics of the chewing action of the user.

In the first embodiment, the display of the display device 22 is controlled based on the fatigue point calculated by the fatigue degree calculation unit 54. By this, a notification indicating the fatigue or information for alleviating the fatigue may be transmitted to the user. Furthermore, the display device 22 may perform conspicuous display in accordance with the fatigue degree of the user. Accordingly, the user may improve the usability of the HMD 100 during a meal.

Although the case where the fatigue point is incremented only when a hard food is chewed is illustrated in the first embodiment, the present disclosure is not limited to this. For example, a predetermined number of points (points smaller than the case where a hard food is chewed) may be incremented even when a soft food is chewed. Alternatively, the number of points to be incremented may be differentiated in accordance with the chewing time T.

Second Embodiment

Next, a head mounted display 100 according to a second embodiment will be described in detail with reference to FIGS. 8 to 10. The second embodiment is characterized in that a fatigue degree (a fatigue point) of a user is calculated using an image captured by a camera 16 in addition to a measurement value of an acceleration sensor 12.

Figure 8:
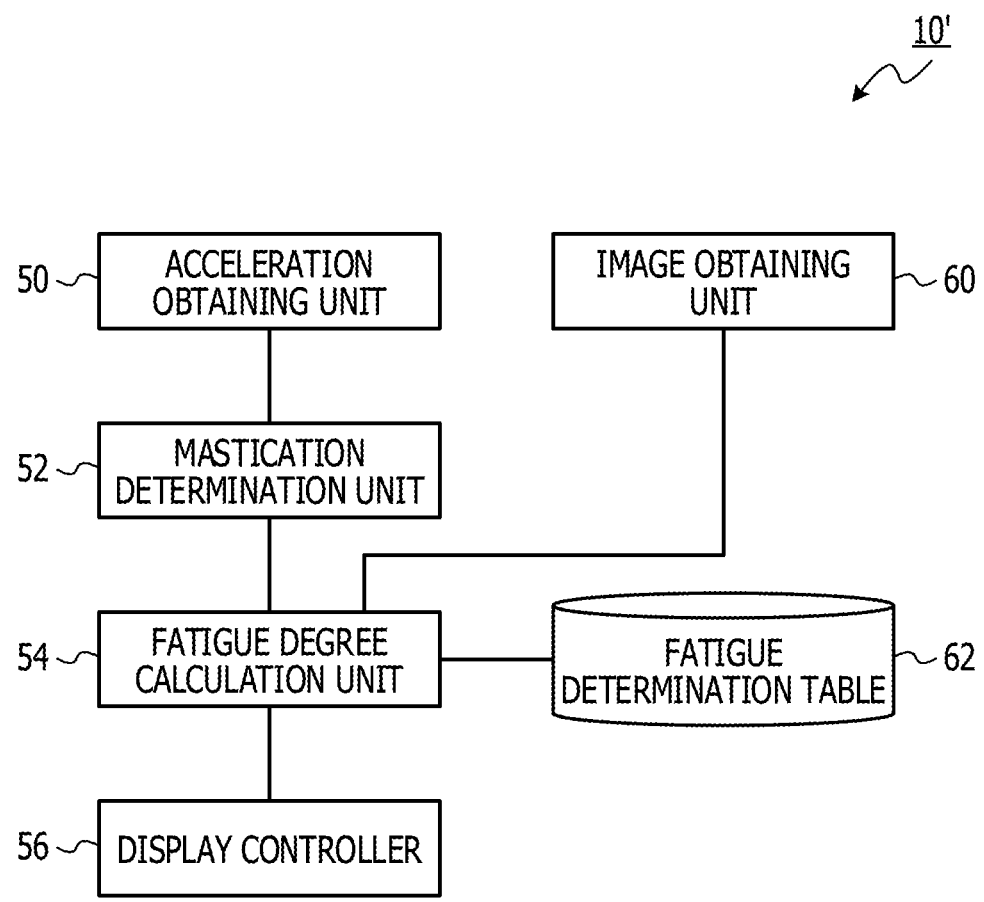
FIG. 8 is a functional block diagram of a control device according to a second embodiment.

FIG. 8 is a functional block diagram illustrating a control device 10' of a head mounted display 100 according to the second embodiment. As illustrated in FIG. 8, in addition to the functions of the units realized in the control device 10 of the first embodiment, a function of an image obtaining unit 60 is realized in the control device 10' according to the second embodiment. The image obtaining unit 60 obtains an image captured by the camera 16 and transmits the image to a fatigue degree calculation unit 54. The fatigue degree calculation unit 54 calculates a fatigue point of the user based on a fatigue determination table 62 (refer to FIG. 10).

Next, the process executed by the control device 10' of the second embodiment will be described with reference to a flowchart of FIG. 9. In the flowchart of FIG. 9, portions different from the flowchart of FIG. 4 are denoted by thick line frames.

Figure 9:
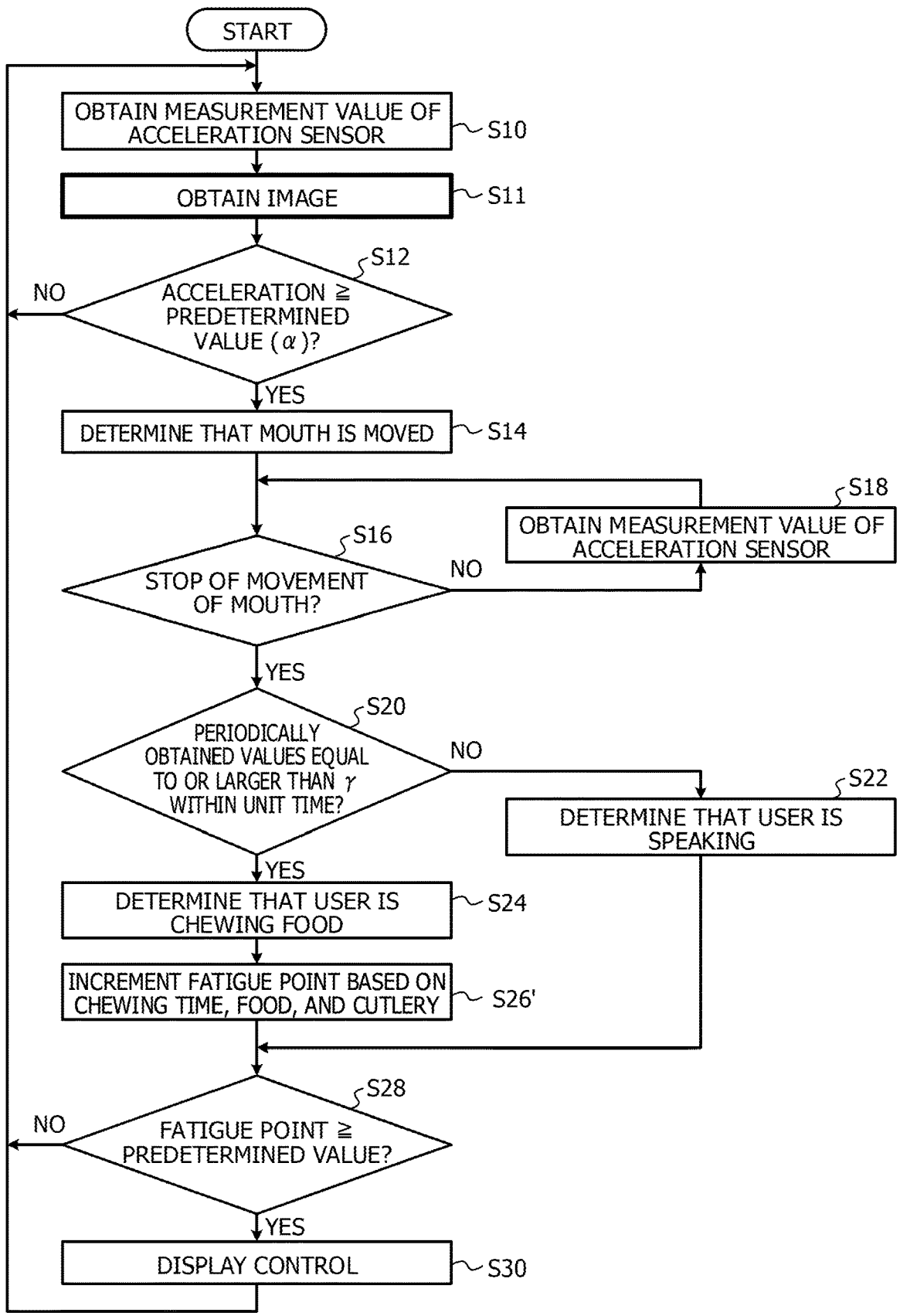
FIG. 9 is a flowchart of a process performed by the control device according to the second embodiment.

In the process in FIG. 9, after the process in step S10 is executed, the image obtaining unit 60 obtains the image captured by the camera 16 in step S11. The order of step S10 and step S11 may be reversed or the processes in step S10 and step S11 may be simultaneously performed.

Thereafter, a process from step S12 to step S24 is performed similarly to the first embodiment. When a mastication determination unit 52 determines that the user is chewing a food in step S24, the process proceeds to step S26' where a process of incrementing a fatigue point is performed based on a chewing time, the food, and a dish with reference to the fatigue determination table 62.

Here, the fatigue determination table 62 has a configuration as illustrated in FIG. 10. Specifically, the fatigue determination table 62 includes items of a "food", "chewability", a "cutlery", "usability", and a "fatigue determination time". In the fatigue determination table 62, chewability of each food and usability of cutlery are defined. Furthermore, in the fatigue determination table 62, a food, a cutlery, and a period of time before it is determined that the user gets tired (the fatigue determination time) when the user eats a certain food are defined. For example, in a case where the user eats meat using a knife and fork, if a chewing time exceeds Td, a fatigue point is incremented by 1. The magnitude relationships among the times illustrated in FIG. 10 is represented as follows, for example: Td<Th<Tm<Tl<Te. In the fatigue determination table 62, the items of "chewability" and "usability may be omitted.

The fatigue degree calculation unit 54 obtains an image (an image obtained immediately before the process in step S14 is performed, for example) obtained before it is determined that a mouth is moved (before it is determined that the determination in step S12 is affirmative). The fatigue degree calculation unit 54 determines a food that the user eats and a cutlery used by the user by performing image processing, such as template matching, on the obtained image. Furthermore, the fatigue degree calculation unit 54 obtains a period of time from when it is determined that the mouth is moved (S14) to when it is determined that the movement of the mouth is stopped (S16) (a chewing time T).

Then the fatigue degree calculation unit 54 extracts a fatigue determination time corresponding to the information (on the food and the cutlery) obtained by the image processing from the fatigue determination table 62, compares the extracted fatigue determination time with the chewing time T, and increments a fatigue point if the chewing time T is longer.

Thereafter, a process in step S28 and step S30 is the same as that in the first embodiment described above. Specifically, also in the second embodiment, a display controller 56 controls display of a display device 22 in accordance with the fatigue point similarly to the first embodiment.

As is apparent from the description above, according to the second embodiment, an acceleration obtaining unit 50, the image obtaining unit 60, the mastication determination unit 52, and the fatigue degree calculation unit 54 realize a function of a detection unit which detects a degree of fatigue of the user with the HMD 100.

As described above, according to the second embodiment, the fatigue degree calculation unit 54 calculates a fatigue point based on an image of a food and cutlery captured by the camera 16 and acceleration, and therefore, the fatigue point of the user may be calculated with high accuracy. Since the display of the display device 22 is controlled based on the fatigue point calculated with high accuracy in the second embodiment, the display may be performed taking the fatigue of the user into consideration. Accordingly, the user may improve the usability of the HMD 100.

Although the case where the fatigue point is calculated using information on a food and information on cutlery obtained from the image is described, the present disclosure is not limited to this, and the fatigue point may be calculated using one of the information on a food and the information on cutlery.

According to the second embodiment, the fatigue determination table 62 may be provided for each user (in accordance with a user). For example, content of the fatigue determination table 62 may be changed depending on likes and dislikes of the user, such as a user who is good at using knife and fork and a user who is good at using chopsticks, since users are a variety of ages and have a variety of dexterity.

In the foregoing embodiments, the gyroscope sensor 14 may be used to calculate the fatigue point. For example, when the user views characters and the like displayed in the display device 22 (characters and the like displayed in a lower portion in a screen of the display device 22), a head may direct downward, and therefore, the user may get more and more tired every time the user views the screen. In this case, if a result of detection of the gyroscope sensor 14 indicates a predetermined value, it may be determined that the user views the lower portion in the screen, and a fatigue point may be incremented based on the number of times the user views the lower portion. By this, the user may calculate the fatigue point based on the number of times the user views the display device 22. Also in this case, a fatigue point to be incremented may be differentiated in accordance with attributes of the user (an age, a gender, a degree of disability).

In the foregoing embodiments, it may be determined whether the user is chewing a food or the user is speaking based on audio information input through the microphone 18.

In the foregoing embodiments, a determination criterion or a value of a fatigue point to be incremented may be changed depending on an age, a gender, a type (a healthy person, an elderly person, or a hearing-impaired person) or the like. By this, a fatigue point may be calculated and the display device 22 may be controlled taking the attributes of the user into consideration.

Although the case where the display device 22 is controlled based on the fatigue when a food is chewed is illustrated in the foregoing embodiments, the present disclosure is not limited to this. For example, a fatigue point may be incremented based on eyestrain and the display device 22 may be controlled based on the fatigue point.

Although the case where display of the display device 22 is controlled based on the fatigue is illustrated in the foregoing embodiments, the present disclosure is not limited to this. Specifically, the fatigue degree calculated by the fatigue degree calculation unit 54 may be used to improve usability of the HMD 100 instead of the control of the display device 22.

The processing functions described above may be realized by a computer. In this case, programs in which content of processes of functions to be included in the processing apparatus are provided. The processing functions are realized in the computer by executing the programs in the computer. The programs including the processing content described therein may be recorded in a computer-readable recording medium (except for carrier waves).

When the programs are to be distributed, a portable recording medium, such as a digital versatile disc (DVD) and a compact disk read only memory (CD-ROM) which include the programs recorded therein, is sold, for example. Alternatively, the programs may be stored in a storage device of a server computer and transmitted from the server computer to another computer through a network so that the program is distributed.

The computer which executes the programs stores the programs recorded in the portable recording medium or the programs transmitted from the server computer in a storage device thereof, for example. Then the computer reads the programs from the own storage device and executes processes in accordance with the programs. The computer may directly read the programs from the portable recording medium and execute processes in accordance with the programs. Alternatively, the computer may execute a program based on the received program every time the program is transmitted from the server computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a processor of a head mounted display to execute a process, the process comprising:

obtaining a result of measurement performed by an acceleration sensor included in the head mounted display;

determining whether a user with the head mounted display is chewing a food or the user is speaking based on the result of the measurement performed by the acceleration sensor; and calculating a fatigue degree of the user based on a determination result obtained in the determining process.

2. The storage medium according to claim 1, wherein the determining includes determining whether the user is chewing a food or the user is speaking based on a waveform of the result of the measurement performed by the acceleration sensor.

3. The storage medium according to claim 1, wherein the calculating includes calculating the fatigue degree of the user based on amplitude of a waveform of the result of the measurement performed by the acceleration sensor when it is determined that the user is chewing a food.

4. The storage medium according to claim 1, wherein the process comprising obtaining an image captured by an imaging unit included in the head mounted display, wherein the calculating includes calculating a fatigue degree of the user based on the image.

5. The storage medium according to claim 4, wherein the calculating includes:

specifying at least one of information on a food chewed by the user and information on cutlery used by the user using the captured image; and calculating a fatigue degree of the user based on the specified information.

6. The storage medium according to claim 1, wherein the calculating includes differentiating a calculation criterion of the fatigue degree depending on a type of the user.

7. The storage medium according to claim 1, wherein the process comprising controlling a display included in the head mounted display based on the calculated fatigue degree of the user.

8. A head mounted display, comprising:

an acceleration sensor; and a processor coupled to the acceleration sensor and configured to:

obtain a result of measurement performed by an acceleration sensor, determine whether a user with the head mounted display is chewing a food or the user is speaking based on the obtained result of the measurement, and calculate a fatigue degree of the user based on a determination result obtained in the determining process.

9. A non-transitory computer-readable storage medium storing a program that causes a processor of a head mounted display to execute a process, the process comprising:

detecting a fatigue degree of a user with the head mounted display;

controlling visibility of display in the head mounted display based on the detected fatigue degree;

obtaining a result of measurement performed by an acceleration sensor included in the head mounted display; and determining whether the user is chewing a food or the user is speaking based on the result of the measurement performed by the acceleration sensor, wherein the detecting includes calculating a fatigue degree of the user based on a result of the determining.

* * * * *